METHOD AND ARRANGEMENT FOR CONVERTING TIME-MODULATED PULSES INTO AMPLITUDE-MODULATED PULSES

Filed Aug. 7, 1948 2 Sheets-Sheet 1

INVENTORS
GUSTAV GUANELLA and
PAUL GÜTTINGER
BY [signature]
ATTORNEY

METHOD AND ARRANGEMENT FOR CONVERTING TIME-MODULATED PULSES INTO AMPLITUDE-MODULATED PULSES

Filed Aug. 7, 1948 2 Sheets-Sheet 2

INVENTORS
GUSTAV GUANELLA and
PAUL GÜTTINGER
BY [signature]
ATTORNEY

Patented May 23, 1950 2,508,672

UNITED STATES PATENT OFFICE 2,508,672

METHOD AND ARRANGEMENT FOR CONVERTING TIME-MODULATED PULSES INTO AMPLITUDE-MODULATED PULSES

Gustav Guanella, Zurich, and Paul Güttinger, Wettingen, Switzerland, assignors to Radio Patents Corporation, New York, N. Y., a corporation of New York Application August 7, 1948, Serial No. 43,144
In Switzerland September 6, 1946

10 Claims. (Cl. 250—27)

The present invention relates to pulse modulation, more particularly to a novel method and system for converting time modulated signal pulses into corresponding amplitude modulated pulses for demodulating or reproducing a signal wave in a receiving station.

When signals or messages are transmitted by means of time-modulated pulses there is a difference, according to whether the width or the position of the pulses is modulated. With width-modulated pulses, the width, that is to say the duration of successive pulses, corresponds to the instantaneous values of a modulating signal. With position-modulated pulses, the degree of modulation is characterized by the distance in time of one or both edges of the pulses from equidistant instants. Time-modulated pulses are demodulated by first converting them into amplitude-modulated pulses. Thereupon, the actual demodulation to the original modulating signal occurs. When converting the width-modulated or position-modulated pulses into amplitude-modulated pulses, it is desirable that the conversion should be as free from distortion as possible.

The present invention is concerned with an improved method and arrangement for achieving this conversion. According to the novel method, signal voltage values proportional to the time values characterizing the modulation of the time-modulated pulses are produced, at least part of said signal voltage values being stored, in such a manner as to result in pulses which occur at equal intervals and have an amplitude proportional to said voltage values.

Figure 1:
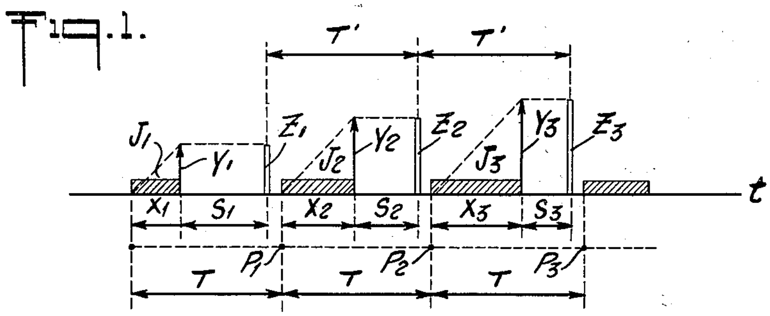
Figure 2:
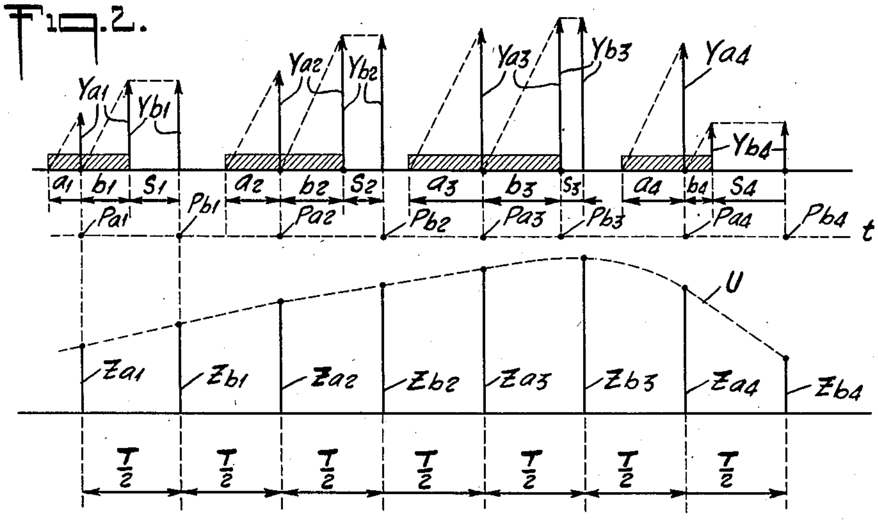
Figures 4, 6:
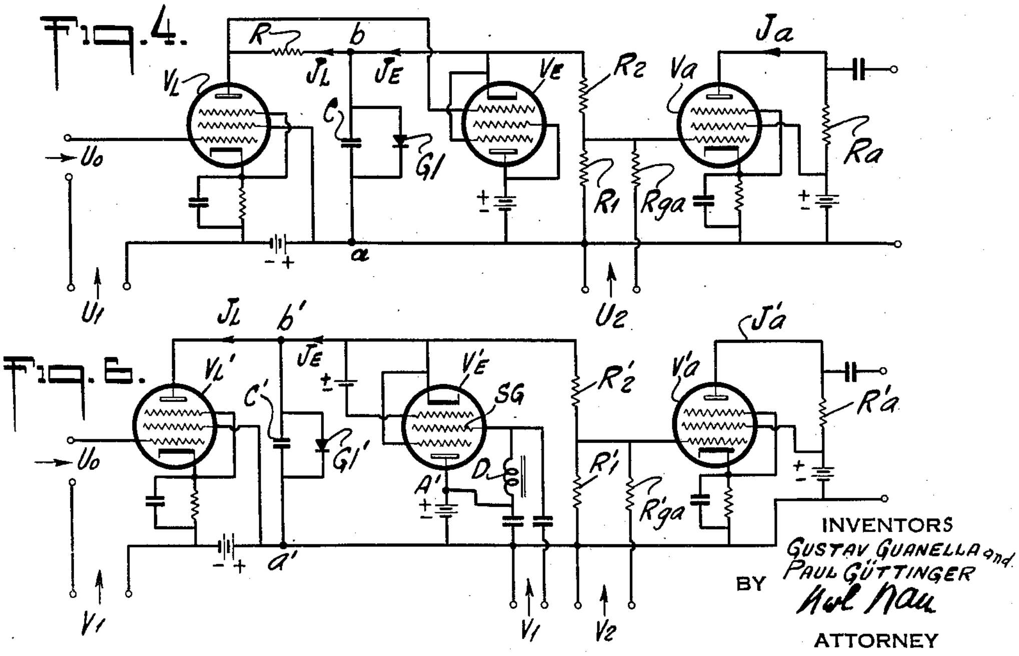
Figures 3A, 3B, 3C, 3D, 5A, 5B, 5C, 5D:
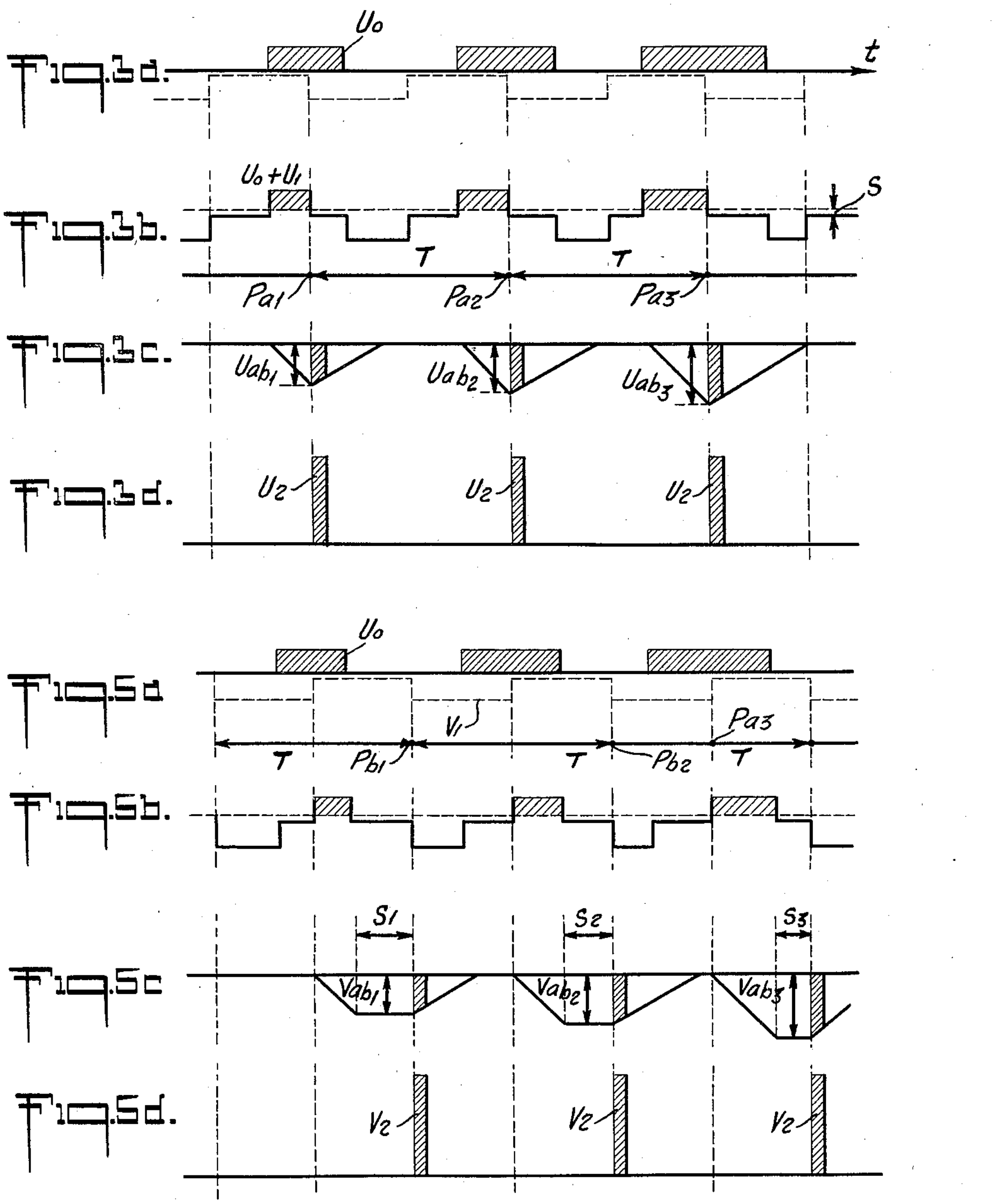

Further objects and novel aspects of the invention will become more apparent from the following detailed description taken in reference to the accompanying drawings forming part of this specification, and wherein:

Figures 1, 2, 3*a* to 3*d* and 5*a* to 5*d* are theoretical diagrams explanatory of the function and operation of the invention; and Figures 4 and 5 are wiring diagrams of suitable circuit arrangements for carrying out the invention.

Referring to Figure 1, $J_1$, $J_2$, $J_3$ etc. are time-modulated pulses shown for different degrees of modulation. The instants at which the pulses commence are characterized by the position of the left-hand pulse edges and follow each other at equal intervals of time T. The durations $X_1$, $X_2$, $X_3$ etc. of the pulses are the momentary time values which characterize the degree of modulation or instantaneous modulating signal values and serve to produce the time-proportional voltage values $Y_1$, $Y_2$, $Y_3$. These voltage values attain their values $Y_1$, $Y_2$, $Y_3$ at the end of each pulse, such as by charging a condenser with constant current during a time corresponding to the pulse durations $X_1$, $X_2$, $X_3$.

There are obtained in this manner amplitude modulated pulses $Z_1$, $Z_2$, $Z_3$ corresponding to the voltages $Y_1$, $Y_2$, $Y_3$. If these amplitude modulated pulses occured immediately at the end of the pulses (right-hand pulse edge), as would be the simplest arrangement, they would not be spaced by equal intervals. This would result in non-linear distortion at the output of the demodulater. According to the invention this distortion is avoided by making the amplitude-modulated pulses follow each other at equal intervals $T'=T$. This is achieved by storing the voltage values $Y_1$, $Y_2$, $Y_3$ and only allowing them to become effective at equidistant points in the form of the amplitude-modulated pulses $Z_1$, $Z_2$, $Z_3$. $S_1$, $S_2$, $S_3$ indicate the corresponding storage times. Thus, the amplitude-modulated pulse occurs only towards the end of an interval T. It is also possible to allow the pulse $Z_1$ to occur at the instant $P_1$ when the next pulse $X_2$ begins, since the pulses start at equal intervals. In all events, the amplitude-modulated pulses Z succeed each other at equal intervals T′, that is at equidistant time positions, so that the demodulation will be linear and accurately follows the shape or curve of the original modulating voltage.

Another use of the method according to the invention relates to the demodulation of width-modulated pulses of the type shown in Figure 2. Here, the pulses are modulated in such a manner that the distance in time of both edges of the pulses from equidistant points $P_{a1}$, $P_{b1}$, $P_{a2}$, $P_{b2}$, $P_{a3}$, $P_{b3}$ etc. serves as the time value characteristic of the instantaneous modulating signal values. Thus, the equidistant instants of time occur at double the pulse frequency, so that every second point $P_{a1}$, $P_{a2}$ falls within a pulse, and the intervening points $P_{b1}$, $P_{b2}$ fall within the gaps between the pulses. The time value $a_1$ measured from the left-hand pulse edge to the point $P_{a1}$ corresponds to a proportional voltage value $Y_{a1}$. This voltage controls the pulse $Z_{a1}$ in a linear relation. The time value $b_1$ corresponds to a voltage value $Y_{b1}$. At the instant when the pulse stops, the voltage $Y_{b1}$ has also reached its end value. The pulse proportional to this voltage should not, however, occur at this instant, but somewhat later at the instant $P_{b1}$. According to the invention, the voltage $Y_{b1}$ is therefore stored during the time $S_1$. The same process repeats itself with all the subsequent pulses. The modulation pulses $Z_{a1}$, $Z_{b1}$, $Z_{a2}$, $Z_{b2}$ etc., occur thus at equal intervals, whereby to fulfill an important condition for a distortion free demodulation accordingly, the envelope U corresponds to the modulation curve or signal at the transmitter. This applies particularly to transmission where the time-modulated pulses at the transmitter are also obtained from equidistant modulating values $Z_{a1}$, $Z_{b1}$ etc., as shown and described in our U. S. Patent No. 2,435,496, entitled Impulse modulation system.

As will be understood, the method according to the invention may be applied to other kinds of time-modulated pulses, for instance position-modulated pulses.

The arrangement for carrying out the method according to the invention will now be explained with reference to width-modulated pulses of the kind shown in Figure 2. The arrangement includes means for converting the time values $a_1$, $b_1$, $a_2$, $b_2$ etc., of the width-modulated pulses into voltages which are proportional to these values, the voltage values $Y_{b1}$, $Y_{b2}$ of the time values characterized by the position of the right-hand edges of the pulses being stored, in the manner described above. Furthermore, means are provided to enable the amplitude-modulated pulses $Z_{a1}$, $Z_{b1}$, $Z_{a2}$, $Z_{b2}$ etc. to be produced at equidistant points $P_{a1}$, $P_{b1}$, $P_{a2}$, $P_{b2}$ etc. which are proportional to the voltage values $Y_{a1}$, $Y_{b1}$, $Y_{a2}$, $Y_{b2}$ etc. The conversion takes place in two separate operations, whereby the time value for the left-hand-edge, that is, at the beginning of the pulse, and the time value for the right-hand edge at the end of the pulse cause control systems to operate alternately.

The conversion of the time values of the left-hand pulse edges with reference to the equidistant points $P_{a1}$, $P_{a2}$, $P_{a3}$ will be explained by reference to the diagrams of Figures 3*a* to 3*d* and the circuit arrangement shown in Figure 4.

The width-modulated pulses of amplitude $U_0$, Figure 3*a*, received from the transmitter are applied to the control grid of a tube $V_L$ together with a pulse voltage $U_1$ obtained from a suitable generator operated in synchronism with the received pulses. The local pulses $U_1$ have a phase lead of 90° relative to the received pulses $U_0$. The two pulses applied to the control grid are shown in Figure 3*a*. The grid bias voltage of tube $V_L$ is so selected that the working point is at the lower bend of the tube operating characteristic. An anode current will therefore only flow when both grid voltages are positive. Time-modulated pulses such as indicated by the shaded areas $U_0+U_1$ in Figure 3*b* will thus occur in the anode circuit of the tube. The width of these pulses corresponds to the time values $a_1$, $a_2$, $a_3$, etc. of Figure 2. As soon as the voltage $U_0+U_1$ is positive and exceeds a certain value S, an anode current $J_L$ flows through the tube $V_L$, charging the condenser C negatively at the terminal *b* through a resistance R. Owing to the voltage drop across the resistance R, the tube $V_E$ will remain blocked until the current $I_L$ ceases to flow. This is the case at the equidistance points $P_{a1}$, $P_{a2}$, $P_{a3}$ etc. After this instant the tube $V_E$ allows current to pass again, owing to its grid being positive. As a result, the condenser C is discharged by a discharging current $J_E$ flowing through the tube $V_E$. The condenser should however only discharge until reaching zero voltage. In order to achieve this and to prevent charging in the opposite direction, a rectifier Gl is connected in parallel with the condenser C. As soon as the terminal *b* tends to become positive, a current flows through the rectifier, which prevents a voltage rise in the opposite direction. This charging and discharging process is illustrated in Figure 3*c*. Charging is completed at the points $P_{a1}$, $P_{a2}$ etc. The charging voltage $U_{ab1}$, $U_{ab2}$ etc. corresponds to the prevailing duration of the pulses shown in Figure 3*b*, and furthermore corresponds to the time values $a_1$, $a_2$, $a_3$ etc. of Figure 2. The actual amplitude-modulated pulses which occur at equidistant time positions are produced by means of a further tube $V_a$. To this end, part of the condenser voltage is applied through a potential-divider $R_1$, $R_2$, to the grid of tube $V_a$. Normally while a pulse is received, the tube is blocked. The grid of tube $V_a$ furthermore has applied to it equally spaced short pulses $U_2$, Figure 3*d*, through a resistance $R_{ga}$. The amplitude of these pulses is so selected as to just reach the starting point of the anode current. The proportional parts of the condenser voltages $U_{ab1}$, $U_{ab2}$ etc. are thus added to the pulse voltages $U_2$, so that the anode currents pulses of tube $V_a$ are proportional to the condenser voltages and in turn to the time values $a_1$, $a_2$, $a_3$ etc.

The conversion of the time values of the right-hand pulse edges with reference to the equidistant points is illustrated in Figures 5 and 6. For the pulses shown in Figure 2, these time values are $b_1$, $b_2$, $b_3$ etc. These values have to be converted into proportional voltage values $Y_{c1}$, $Y_{c2}$ etc. and stored during the periods $S_1$, $S_2$, etc. in order to produce proportional impulses $Z_{b1}$, $Z_{b2}$ etc. at the equidistant points $P_{b1}$, $P_{b2}$, as shown in Figure 2.

A circuit arrangement for converting the time values of the right-hand pulse edges is shown in Figure 6.

In the latter, the input grid of tube $V_L'$ is excited by the width-modulated pulses $U_0$ received from the transmitter and a pulse voltage $V_1$ supplied by a local generator. The local pulses have a phase lag of 90° relative to the received pulses. The pulses on the control grid of tube $V_L'$ are shown in Figure 5*a*. The grid bias voltage is again so selected that the working point lies on the lower bend of the characteristic operating curve of the tube. An anode current thus flows only when both the grid control voltages are positive. Thus time-modulated pulses occur in the anode circuit, such as are indicated by the shaded areas in Figure 5*b*. The width of these pulses corresponds to the time values $b_1$, $b_2$, $b_3$, etc. of Figure 2. As soon as the voltage $U_0+U_1$ becomes positive, an anode current $J_L$ flows in the tube $V_L'$, which charges the condenser C′ negatively at the terminal *b′*. The charging voltage $V_{ab}$ attained after each pulse is proportional to the duration of the shaded pulses shown in Figure 5*b*. At the end of the pulses, voltages $V_{ab1}$, $V_{ab2}$, etc. on the condenser C′ remain stored for the periods $S_1$, $S_2$ etc. up to the instants $Pb_1$, $Pb_2$ etc. These instants lie in the middle between the equidistant points $P_{a1}$, $P_{a2}$, $P_{a3}$. At the instants $P_{b1}$, $P_{b2}$, $P_{b3}$ etc. pulses with an amplitude proportional to the stored voltages $V_{ab1}$, $V_{ab2}$ etc. are produced. This is achieved by rendering a parallel-connected tube $V_E'$ current-conductive at the instants $P_{b1}$, $P_{b2}$ etc. by applying the pulse voltage $V_1$ to the screen grid SG thereof. The screen grid is connected through a choke coil D with the anode A. The condenser discharges through the tube down to zero voltage. A rectifier Gl′ is connected in parallel with the condenser C′ to prevent the latter from being charged with opposite polarity. A further tube $V_a'$ $P_{b2}$, etc. is provided for producing the pulses at the instants $P_{b1}$ (shaded areas in Figure 5*c*). The control grid of this tube is connected to a potential-divider which is arranged in parallel with the condenser C′. The control grid also has control pulses $V_2$ (Figure 5*d*) applied to it through a resistance, these pulses producing corresponding anode current pulses $Ja'$. The control pulses $V_2$ and the grid bias voltages are so selected that the control portion of the condenser voltage produces proportional current pulses.

The receiving arrangement combines the two arrangements shown in Figures 4 and 6. At the output end of this combined receiving arrangement there are obtained amplitude-modulated pulses according to Figures 3*c* and 5*c*. The pulses follow each other at constant intervals $P_{a1}$, $P_{b1}$, $P_{a2}$, $P_{b2}$ etc. with twice as many pulses as there are width-modulated pulses at the input end of the arrangement. The pulse voltage $U_0$ supplied to both arrangements may for instance be derived from a common receiver in which the high-frequency pulse signals received through an aerial are amplified and converted into width-modulated pulses. Operating in synchronism with the received signal pulses is a generator producing the non-modulated control pulses $U_1$ and $V_1$ for both systems. The generator is provided with special means, whereby the pulses supplied to both amplifiers are phase-displaced by 90° compared with the non-modulated receiving pulses. Voltage $U_1$ leads the voltage $U_0$ and voltage $V_1$ lags behind the voltage $U_0$.

The output ends of the amplifiers are connected in parallel so that there is double the number of pulses in the common output circuit. The pulses succeed each other at constant intervals of time, and have their amplitude modulated in accordance with the time values of the width-modulated pulses.

When time-modulated pulses of the kind shown in Figure 1 have to be converted into amplitude-modulated pulses, the arrangement shown in Figure 6 can be used. In this case it is also necessary to store the voltages $Y_1$, $Y_2$, $Y_3$, etc. during the corresponding times $S_1$, $S_2$, $S_3$, etc.

We claim:

1. In a system for receiving width modulated signal pulses of the type having equi-spaced starting edges and widths proportional to the instantaneous values of a modulating signal, a condenser with means for successively charging the same by the received signal current pulses, first switching means operated in synchronism with the pulse repetition frequency to initiate a discharge of said condenser after lapse of predetermined equal time intervals from each starting instant of successive signal pulses, and further switching means also operated in synchronism with the pulse repetition frequency and connected to said condenser for segregating amplitude modulated discharge current pulses of constant width spaced from each other by equal time intervals.

2. In a system for receiving width modulated signal pulses of constant amplitude and having equi-spaced starting edges and widths proportional to the instantaneous values of a modulating signal being received, an input circuit, a condenser, a constant current device connected between said input circuit to said condenser to successively charge said condenser by the signal current pulses to voltages proportional to the respective pulse widths, first switching means operated in synchronism with the pulse repetition frequency and adapted to initiate a discharge of said condenser after lapse of predetermined equal time intervals from each starting instant of successive signal pulses, and second switching means connected to said condenser also operated in synchronism with the pulse repetition frequency for segregating amplitude modulated discharge current pulses of constant width spaced by equal time intervals from each other.

3. In a system for receiving width modulated signal pulses of constant amplitude having equi-spaced starting edges and widths proportional to the instantaneous values of a modulating signal being received, an input circuit, a condenser, a first electron discharge device connecting said input circuit to said condenser to successively charge said condenser by the signal current pulses to voltages proportional to the respective pulse widths, a second electron discharge device connected to said condenser with means for controlling the impedance thereof in synchronism with the pulse repetition frequency to initiate the discharge of said condenser after a lapse of predetermined equal time intervals from each starting instant of successive signal pulses, and a further electron discharge device controlled by impulses also in synchronism with the pulse repetition frequency, said last device being connected to said condenser to derive successive amplitude modulated discharge current pulses of constant width spaced by equal time intervals from each other.

4. In a method of receiving signal pulses having equi-spaced starting edges and widths modulated according to the instantaneous values of a modulating signal, the steps of converting said signal pulses into pulses of constant width and amplitude proportional with the respective widths of the original pulses, and variably delaying the converted pulses to produce substantially equi-spaced final pulses having amplitudes varying according to said modulating signal.

5. In a method of receiving modulated signal pulses of constant amplitude and having equi-spaced starting edges and widths proportional to the instantaneous values of a modulating signal, the steps of converting the received pulses into pulses of constant width and amplitude varying in proportion to the widths of the respective original pulses, and variably time delaying the converted pulses to produce substantially equi-spaced final pulses having amplitudes varying in accordance with said modulating signal.

6. In a method of receiving width modulated signal pulses of constant amplitude and having equi-spaced starting edges and widths proportional to the instantaneous amplitudes of a modulating signal, the steps of integrating the received signal current pulses to produce voltages having amplitudes proportional to the respective pulse widths, and variably storing said voltages and deriving equi-spaced signal pulses of constant width from the stored voltages having amplitudes varying according to said modulating signal.

7. In a system for receiving signal pulses having equi-spaced starting edges and widths modulated in accordance with the instantaneous amplitudes of a modulating signal, means for integrating the received pulses to produce voltages having amplitudes varying in proportion to the respective pulse widths, means for variably time delaying the integrated voltages and deriving therefrom final voltage pulses of constant width at equidistant spacing intervals equal to the original pulse spacing intervals.

8. In a system for receiving width modulated signal pulses of constant amplitude and having equi-spaced starting edges and widths proportional to the instantaneous amplitudes of a modulating signal, means for integrating the received signal pulses to produce voltages having amplitudes proportional to the respective pulse widths, means for variably storing said voltages and for deriving therefrom final substantially equi-spaced voltage pulses of substantially constant width and having amplitudes varying in accordance with said modulating signal.

9. In a method of receiving width modulated signal pulses of constant amplitude having equi-spaced starting edges and widths proportional to the instantaneous amplitudes of a modulating signal, the steps of integrating the received signal pulses to produce voltages having amplitudes proportional to the respective pulse widths, and variably storing said voltages and deriving therefrom final equi-spaced voltage pulses of constant width and having a frequency equal to the original pulse repetition frequency and having amplitudes varying in accordance with said modulating signal.

10. In system for receiving width modulated signal pulses of constant amplitude having equi-spaced starting edges and widths proportional to the instantaneous amplitudes of a modulating signal, means for integrating the received pulses to produce voltages having amplitudes proportional to the respective pulse widths, means for variably storing said voltages and for deriving therefrom final substantially equidistant pulses of constant width, said final pulses having a frequency equal to the original pulse repetition frequency and amplitudes varying in accordance with the instantaneous amplitudes of said modulating signal.

GUSTAV GUANELLA.
PAUL GÜTTINGER.

REFERENCES CITED

The following references are of record in the file of this patent:

UNITED STATES PATENTS

| Number | Name | Date |
|---|---|---|
| 2,438,907 | Frankel et al. | Apr. 6, 1948 |
| 2,457,140 | Frankel | Dec. 28, 1948 |